United States Patent [19]
Ellison

[11] Patent Number: 5,296,141
[45] Date of Patent: Mar. 22, 1994

[54] MAGNETIC WATER CONDITIONER

[76] Inventor: Mearl E. Ellison, 8600 Contrares, Space 69, Paramount, Calif. 90723

[21] Appl. No.: 11,466

[22] Filed: Jan. 28, 1993

[51] Int. Cl.$^5$ .............................................. C02F 1/48
[52] U.S. Cl. ..................................... 201/222; 123/538
[58] Field of Search ...................... 210/222; 123/538; 335/304, 306

[56] References Cited

U.S. PATENT DOCUMENTS

| | | | |
|---|---|---|---|
| D. 200,995 | 4/1965 | Hiers | 23/207 |
| D. 220,958 | 6/1971 | Marsh | 23/207 |
| D. 318,516 | 7/1991 | Ellison et al. | 23/207 |
| 2,652,925 | 9/1953 | Vermeiren | 210/222 |
| 2,657,342 | 10/1953 | Stem | 335/306 |
| 2,695,709 | 11/1954 | Stearns et al. | 210/1.5 |
| 2,838,179 | 6/1958 | Thomas | 210/223 |
| 2,979,202 | 4/1961 | Orbeliani | 209/223 |
| 3,028,963 | 4/1962 | Rose | 210/139 |
| 4,146,479 | 3/1979 | Brown | 210/222 |
| 4,265,746 | 5/1981 | Zimmerman, Sr. et al. | 210/222 |
| 4,265,754 | 5/1981 | Menold | 210/222 |
| 4,265,755 | 5/1981 | Zimmerman | 210/222 |
| 4,367,143 | 1/1983 | Carpenter | 210/222 |
| 4,572,145 | 2/1986 | Mitchell et al. | 210/222 |
| 4,711,271 | 12/1987 | Weisenbarger et al. | 210/222 |
| 4,808,306 | 2/1989 | Mitchell et al. | 210/222 |
| 4,995,425 | 2/1991 | Weisenbarger et al. | 210/222 |
| 5,078,870 | 1/1992 | Carpenter | 210/222 |

FOREIGN PATENT DOCUMENTS 2122253A 6/1984 United Kingdom ................ 123/536

Primary Examiner—Matthew O. Savage
Attorney, Agent, or Firm—Stetina and Brunda

[57] ABSTRACT

A magnetic device for treating fluid flowing through a conduit comprising a housing having an open upper end, a closed bottom end and defining an interior compartment. Positioned within the interior compartment upon a plurality of rod members disposed therein is a pair of permanent magnets. A mass of non-ferromagnetic filler material is also disposed within the interior compartment and substantially encapsulates the magnets and rod members. Attached to the housing is a cover member which encloses the interior compartment. The device further includes a clamp assembly which is used to releasably attach the housing to the conduit in a manner wherein the conduit extends along and is abutted against the cover member so that fluid passing through the conduit will be affected by the magnetic field emanating from the magnets disposed within the interior compartment of the housing.

6 Claims, 2 Drawing Sheets

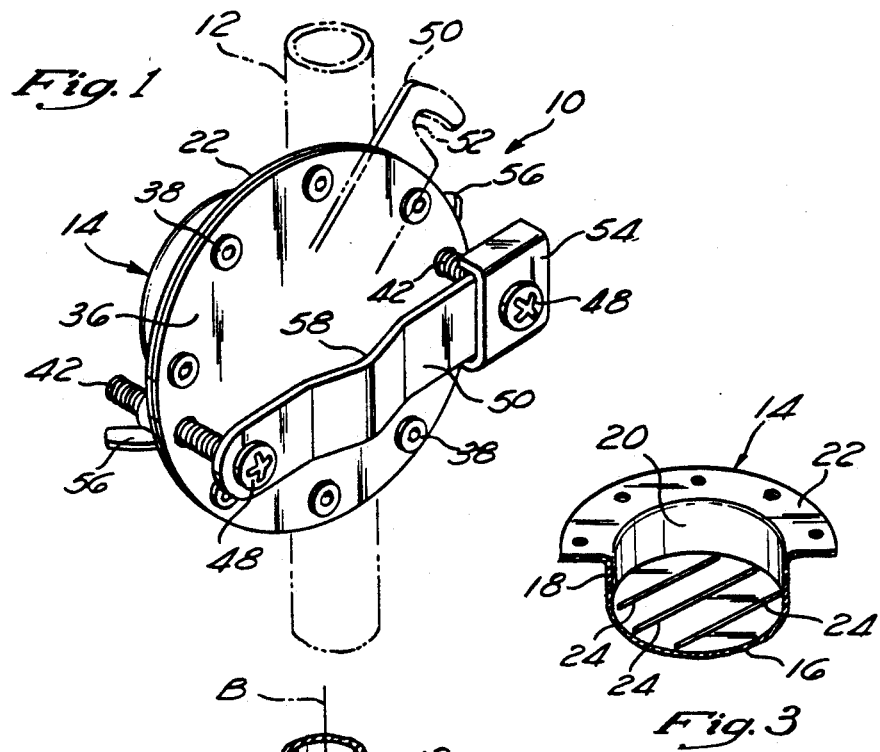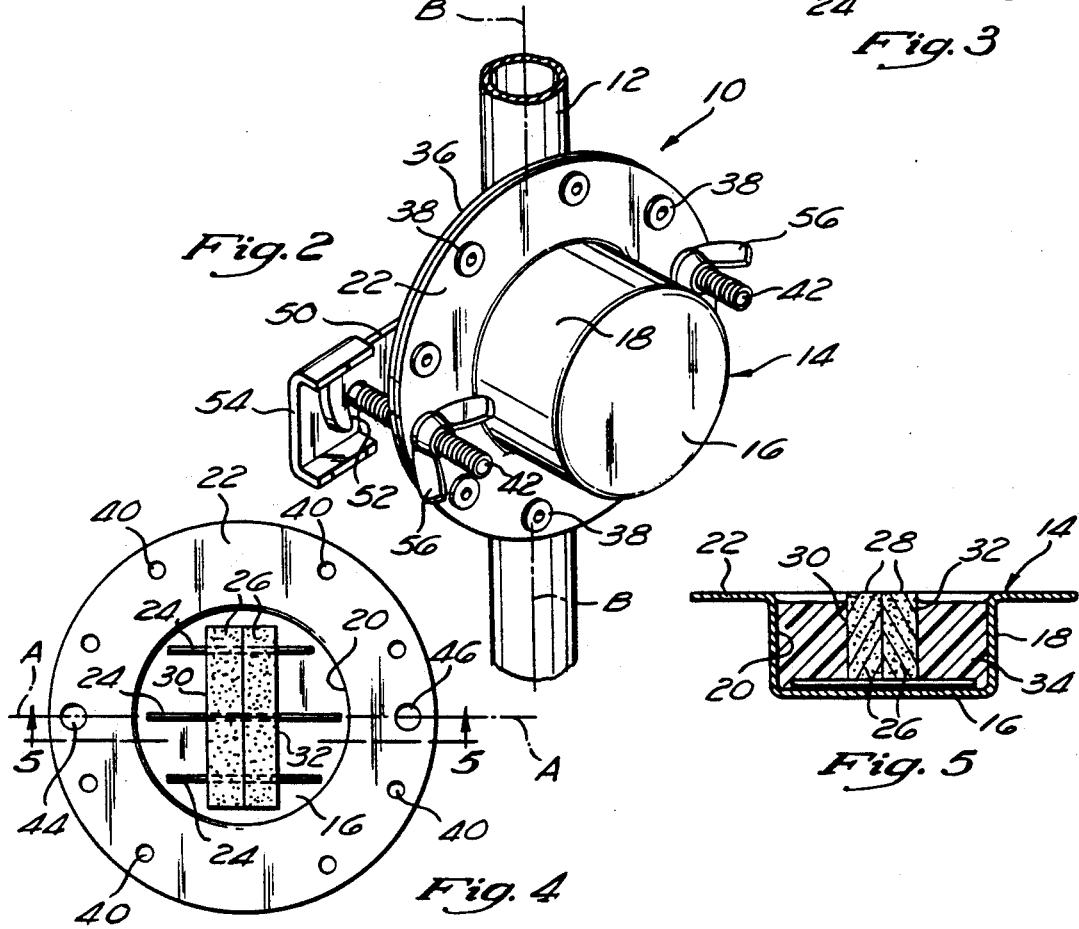

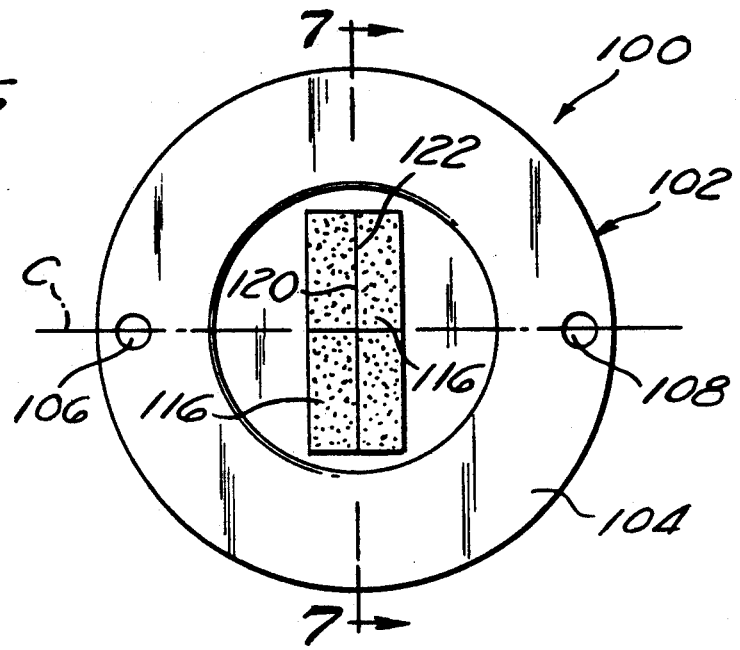
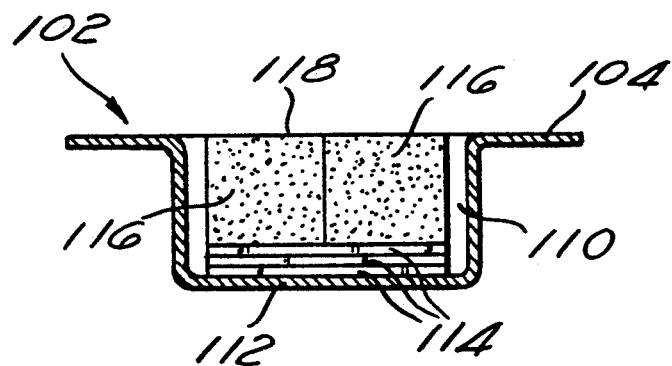

MAGNETIC WATER CONDITIONER

FIELD OF THE INVENTION

The present invention relates generally to fluid treating devices, and more particularly to a magnetic water conditioning device.

BACKGROUND OF THE INVENTION

As is well known in the prior art, the application of a magnetic field to certain types of fluids flowing through a conduit has a beneficial effect on such fluids. Examples of certain fluids upon which magnetic fields are known to have a beneficial effect include gasoline, diesel fuel, home heating oil and water. In this respect, U.S. Pat. No. 4,572,145 to Mitchell, et al. describes a device which positions a magnetic field adjacent to an automotive fuel line for purposes of improving the performance of the engine. Other devices such as that disclosed in U.S. Pat. No. 4,265,754 to Menold are adapted to produce a magnetic field adjacent to a flow of fresh water for purposes of softening the water. In other applications, magnetic devices are placed upon pipes used for transmitting crude oil for purposes of decreasing the build up of paraffin on the interior of the pipes.

Magnetic devices for use in treating fresh water have been developed since virtually every household having a fresh water supply plumbed thereto is affected to some degree by the incrustation of calcium salts and other compounds in the interiors of the water transmitting conduits of the house. Such incrustation is often referred to as "scale" which can take various forms, but is typically created by substances such as calcium carbonate, calcium sulfate, barium sulfate, sodium chloride and magnesium sulfate. In crude oil transmission, scale is often formed by various oils, waxes and greases in addition to paraffin. After there is a sufficient detrimental build up of scale in the pipes or other transmission conduits, it becomes necessary to replace the pipes since there is no way of easily removing the incrustation.

It has been found that since most substances creating scale in water, fuel and oil transmitting conduits are diamagnetic, subjecting the substances to a strong magnetic field induces polarization in the substances in such a way that the diamagnetic molecules thereof are repelled by the magnetic field and by other polarized diamagnetic molecules. Since the diamagnetic substances possess this characteristic, formation of objectional incrustation, i.e. scale deposits, on the inside of the transmission conduit or pipe is prevented by inducing polarization which causes the diamagnetic substances to move away from the inner surface of the conduit when under the influence of a sufficiently strong magnetic field. As such, many prior art water treating magnetic devices have been developed to prevent the formation of scale by magnetically acting on the offending compounds and causing them to be discharged in the flowing water.

With regard to the various magnetic water treating devices that have been developed in the prior art, such devices generally incorporate electromagnetic coils and/or permanent magnets as a means for creating the water treating magnetic fields. In those prior art devices employing permanent magnets, the devices are oftentimes positioned within or near a reservoir or conduit containing the water to be treated. The size, intensity and dispersion pattern of the magnetic field is generally controlled by the size, positioning and polar arrangement of the permanent magnets within the device. Though functioning to position a magnetic field adjacent the flowing water, many prior art magnetic water treatment devices possess certain deficiencies which detract from their utility. In this respect, many prior art permanent magnet water treatment devices are not optimal for use in all water treatment applications since such devices are not adapted to be quickly and easily mounted upon an existing water pipe or other water flow conduit. Additionally, in many prior art devices, a strong enough magnetic field is not provided, particularly on larger diameter pipes or conduits. Thus, a substantial proportion of the water flowing through the pipe is not subjected to a field of sufficient intensity for a long enough period of time to achieve the desired conditioning effect. The present invention overcomes these and other deficiencies associated with prior art magnetic fluid treating devices, and more particularly, magnetic water conditioning devices.

SUMMARY OF THE INVENTION

In accordance with a first embodiment of the present invention, there is provided a magnetic device for treating fluid flowing through a conduit. In the first embodiment, the device comprises a housing having an open upper end and a closed bottom end, with the housing itself comprising a bottom wall portion, a side wall portion extending upwardly from the bottom wall portion, and an interior compartment defined by the side wall and bottom wall portions. The housing further comprises a flange portion which extends laterally outward from the side wall portion in substantially parallel relation to the bottom wall portion and defines the open upper end of the housing. The bottom wall portion preferably has a generally circular configuration, with the side wall portion having a generally cylindrical configuration such that the side wall and bottom wall portions define a generally cylindrical interior compartment. Additionally, the flange portion preferably has a circular configuration and extends radially outward from the side wall portion.

Disposed within the interior compartment is at least one and preferably a pair of permanent magnets. In the preferred embodiment, each of the magnets has a top surface and first and second opposed side surfaces of differing magnetic polarity. The magnets are positioned within the interior compartment in a repetitive magnetic polarity arrangement, with the first side of one magnet of the pair being abutted against the second side of the other magnet of the pair.

The magnetic device further comprises a plurality of elongate rod members which are disposed within the interior compartment and attached to the bottom wall portion of the housing in spaced, parallel relation. The permanent magnets are positioned on and extended laterally across each of the rod members in substantially perpendicular relation thereto, and thus are separated from the bottom wall portion by the rod members. After the magnets have been positioned and/or fixed within the interior compartment in the aforementioned orientation, a space occupying material such as an epoxy resin or other non-ferromagnetic, setable material is poured into the interior compartment so as to surround the magnets and to fully or partially fill in the empty space within the interior compartment.

Once the permanent magnets have been positioned within the interior compartment and the non-ferromagnetic filler material poured thereinto, a cover member is rigidly attached to the flange portion in a manner enclosing the interior compartment. Importantly, each of the magnets is sized such that the top surfaces thereof are abutted against the inner surface of the cover member when the cover member is rigidly attached to the flange portion of the housing.

The magnetic device constructed in accordance with the present invention further includes a means for releasably attaching the housing to the conduit in a manner wherein the conduit extends along and is abutted against the outer surface of the cover member so that fluid passing through the conduit will be affected by the magnetic field emanating from the permanent magnets disposed within the interior compartment. In the preferred embodiment, the releasable attaching means comprises first and second elongate fasteners which are extensible through first and second sets of coaxially aligned mounting apertures disposed within the cover member and flange portion in diametrically opposed relation. The attaching means further comprises a clamp member which has a first end rotatably connected to the proximal end of the first fastener and a second end configured to releasably receive the proximal end of the second fastener. First and second retaining members are also provided which are threadably engageable to the distal ends of the first and second fasteners.

During the use of the attaching means, the tightening of the first and second retaining members subsequent to the positioning of the clamp and cover members on opposed sides of the conduit and the receipt of the proximal end of the second fastener into the second end of the clamp member is operable to compress the conduit between the clamp member and outer surface of the cover member, thus retaining the magnetic device on the conduit. Since the magnetic device is typically connected to a conduit having a tubular configuration, the clamp member has an outwardly bowed central portion which is adapted to accommodate the tubular conduit. Advantageously, the use of the releasable attaching means allows the present magnetic water treatment and conditioning device to be quickly and easily mountable to and removable from a water pipe or other water flow conduit.

In accordance with a second embodiment of the present invention, there is provided a magnetic device comprising a housing which is substantially identical to the housing previously described with respect to the first embodiment but does not include the rivet receiving apertures in the flange portion thereof. Disposed within the interior compartment of the housing and attached to the bottom wall portion thereof is at least one elongate support strip. Positioned on and extending along the support strip is at least one permanent magnet which is separated from the bottom wall portion thereby. In the second embodiment, the permanent magnet positioned on the support strip comprises at least one pair of permanent magnet segments, each of which have a top surface and first and second opposed side surfaces of differing magnetic polarity. The magnet segments are preferably positioned within the interior compartment upon the support strip in a repetitive magnetic polarity arrangement, with the first side of one segment of the pair being abutted against the second side of the other segment of the pair. The support strip may be sized to have from one to four pairs of magnet segments extended along the upper surface thereof.

In the second embodiment, the support strip upon which one or more pairs of the magnet segments are positioned, is sized to elevate the segments to a level within the interior compartment whereat the top surfaces thereof are abutted against the inner surface of the cover member when such is attached to the flange portion of the housing. Additionally, the support strip may comprise a plurality of support strips which are stacked in a contiguous, overlying relationship, with additional strips being added as is needed to elevate the magnet segments to the proper level within the interior compartment. The support strips are preferably fabricated from stainless steel, while the magnet segments preferably comprise neodymium magnets.

BRIEF DESCRIPTION OF THE DRAWINGS

These as well as other features of the present invention will become more apparent upon reference to the drawings wherein:

FIG. 1 is a rear perspective view of a magnetic fluid treating device constructed in accordance with a first embodiment of the present invention as attached to a tubular fluid conduit;

FIG. 2 is a front perspective view of the magnetic fluid treating device as attached to a tubular fluid conduit;

FIG. 3 is a cross-sectional view of the housing of the magnetic fluid treating device;

FIG. 4 is a top view of the magnetic fluid treating device having the cover member and attaching means removed therefrom;

FIG. 5 is a cross-sectional view of the magnetic fluid treating device taken along line 5—5 of FIG. 4;

FIG. 6 is a top view of a magnetic fluid treating device constructed in accordance with a second embodiment of the present invention having the cover member and attaching means removed therefrom; and FIG. 7 is a cross-sectional view of the magnetic fluid treating device of the second embodiment taken along line 7—7 of FIG. 6.

DETAILED DESCRIPTION OF THE PREFERRED EMBODIMENT

Referring now to the drawings wherein the showings are for purposes of illustrating preferred embodiments of the present invention only, and not for purposes of limiting the same, FIGS. 1 and 2 perspectively illustrate a magnetic device 10 constructed in accordance with a first embodiment which is utilized to treat fluids flowing through a conduit 12 to which it is attached. In the first embodiment, the magnetic device 10 is utilized as a water conditioning device for purposes of affecting magnetic treatment of water passing through the conduit 12. The conduit 12 to which the magnetic device 10 is attached for purposes of conditioning fresh water is a standard, tubularly configured water pipe. When attached to the conduit 12 or water pipe, the magnetic device 10 is adapted to prevent the build up of scale within the conduit 12 by subjecting the diamagnetic, scale creating substances typically found within the fresh water to a magnetic field. As previously specified, substances which typically creating scale problems in water lines include calcium carbonate, calcium sulfate, barium sulfate, sodium chloride and magnesium sulfate.

In addition to aiding in the prevention of scale formation, the application of the magnetic field to the water passing through the conduit 12 also conducts a water softening operation. In this respect, it is believed that the magnetic device 10 supplies electrons to undesired cations in the water, thus causing the cations to be transformed into whole molecules which are more stable than the ions. It has been found that water in this state exhibits the properties of soft water despite the fact that the offending substances extracted by other softening processes are still present. The soft water properties are achieved since the offending substances in the form of whole molecules are much more stable than their corresponding cations. As such, the substances do not deposit out freely in pipes and on plumbing fixtures and do not interfere with the solubility and effectiveness of detergents and other products. Furthermore, the substances are harmless from a health standpoint.

In addition to the aforementioned water softening and scale prevention applications, it will be recognized that the magnetic device 10 may also be utilized to treat other types of fluids including crude oil and gasoline. In this respect, the magnetic device 10 may be placed on crude oil transmission conduits to decrease the build up of paraffin or other oils, waxes and greases on the interior of the conduit or pipe. Additionally, the magnetic device 10 may be placed on the fuel line between the fuel pump and the carburetor of an internal combustion engine, such as is used in an automobile or a tractor, to improve engine performance and to produce a cleaner exhaust emission. However, as previously specified, the magnetic device 10 is preferably utilized to soften water and to prevent incrustation or scaling within water transmission conduits or pipes by magnetically acting on the offending compounds and causing them to be discharged in the flowing water.

In the preferred embodiment, the magnetic device 10 generally comprises a housing 14 which has an open upper end and a closed bottom end. The housing itself comprises a generally circular bottom wall portion 16 having a generally cylindrical side wall portion 18 extending upwardly therefrom. The bottom wall portion 16 and side wall portion 18 define a generally cylindrical interior compartment 20. Extending radially outward from the side wall portion 18 in substantially parallel relation to the bottom wall portion 16 is a generally circular flange portion 22 which defines the open upper end of the housing 14.

Disposed within the interior compartment 20 and attached to the bottom wall portion 16 in equidistantly spaced, parallel relation, are three elongate rod members 24. Also positioned within the interior compartment 20 is a pair of permanent magnets 26, each of which defines a top surface 28 and first and second opposed side surfaces 30, 32 of differing magnetic polarity. Each of the permanent magnets 26 preferably comprises a bar-type, neodymium magnet which is approximately one-fourth inch thick, one and one-half inches long, and one-half inch wide. However, it will be recognized that other types of magnets such as ceramic magnets may also be utilized. In the preferred embodiment, the magnets 26 are positioned within the interior compartment 20 upon the rod members 24, and are extended laterally across each of the rod members 24 in substantially perpendicular relation thereto. Additionally, the magnets 26 are preferably positioned upon and/or attached to the rod members 24 in a repetitive magnetic polarity arrangement, such that the side surface 30 of one magnet 26 of the pair which is of a first polarity is abutted against the side surface 32 of the other magnet 26 of the which is of a second polarity opposite the first polarity. However, the magnets 26 may also be positioned upon and/or attached to the rod members 24 in an alternating magnetic polarity arrangement such that the first side 30 of one magnet of the pair which is of a first polarity is abutted against the first side 32 of the other magnet of the pair which is also of the first polarity. As will be recognized, due to the positioning of the magnets 26 upon the rod members 24, the magnets 26 are separated from the bottom wall portion 16 of the housing 14 by the rod members 24.

After the magnets 26 have been initially affixed to and/or positioned upon the rod members 24 within the interior compartment 20 of the housing 14, a quantity of epoxy or other space-occupying material capable of forming a generally solid mass may be poured into the interior compartment 20. After setting and solidifying, such epoxy forms a generally solid mass 34 fully surrounding the magnets 26 as well as the rod members 24, and allowing only the top surfaces 28 of the magnet 26 to remain exposed above the top surface of the epoxy mass 34. The epoxy or other polymeric material forming the mass 34 is preferably non-ferromagnetic so as not to interfere with the dispersion pattern, magnetic flux or other characteristics of the magnetic field which emanates from the magnetic device 10. However, the magnetic device 10 is equally functional without the solid mass 34 being formed within the interior compartment 20.

Subsequent to the positioning of the magnets 26 within the interior compartment 20 and the formation of the mass of epoxy 34 therewithin, rigidly attached to the flange portion 22 of the housing 14 is a cover member 36 which completely encloses the interior compartment 20. In the preferred embodiment, the cover member 36 is circularly configured and has an outer diameter substantially equal to the outer diameter of the flange portion 22. The cover member 36 is attached to the flange portion 22 via rivets 38 which are inserted into each of eight coaxially aligned pairs of apertures 40 disposed within the peripheral regions of the flange portion 22 and cover member 36. However, it will be recognized that the cover member 36 may be attached to the flange portion 22 by methods other than through the utilization of the rivets 38. As seen in FIG. 5, the magnets 26 are preferably sized such that the top surfaces 28 thereof are substantially co-planar with the outer surface of the flange portion 22 when the magnets 26 are positioned upon and/or attached to the rod members 24. As such, when the cover member 36 is rigidly attached to the flange portion 22 and encloses the interior compartment 20, the top surfaces 28 of the magnets 26 will be abutted against the inner surface of the cover member 36. However, as previously specified, the bottom surfaces of the magnets 26 are separated from the bottom wall portion 16 by the rod members 24 upon which they are positioned.

The magnetic device 10 further comprises a means for releasably attaching the housing 14 to the conduit 12 in a manner wherein the conduit 12 extends along and is abutted against the outer surface of the cover member 36 so that water or another fluid passing through the conduit 12 will be affected by the magnetic field emanating from the magnets 26 disposed within the interior compartment 20. The releasable attaching means preferably comprises a pair of elongate fasteners 42 such as conventional Phillips head screws which are extensible through first and second sets of coaxially aligned mounting apertures 44, 46 disposed within the flange portion 22 and cover member 36 in diametrically opposed relation. As seen in FIG. 4, the first and second sets of mounting apertures 44, 46 are centered on the axis A of the middle one of the three equidistantly spaced rod members 24. The fasteners 42 are extended through the first and second sets of mounting apertures 44, 46 in a manner wherein the head portions 48 thereof are disposed adjacent the cover member 36 rather than the flange portion 22. Rotatably engaged to one fastener 42 of the pair is an elongate clamp member 50. The clamp member 50 is rotatably engaged to a selected fastener 42 of the pair prior to the insertion thereof into one of the sets of mounting apertures 44, 46 via the passage of the fastener 42 through an aperture disposed within one of the opposed ends of the clamp member 50. Importantly, this aperture is sized so as to exceed the thread diameter of the fastener 42 to which it is engaged, thus allowing the clamp member 50 to be freely rotatable thereabout. As seen in FIG. 2, the end of the clamp member 50 opposite that rotatably engaged to one fastener 42 of the pair has a hook-like configuration and includes a laterally extending notch 52 therein which is sized to accommodate the other fastener 42 of the pair. Positioned on the fastener 42 of the pair which is to be releasably received into the notch 52 is a generally C-shaped guard member 54. As will be recognized, the guard member 54 is positioned upon the fastener 42 prior to the insertion thereof into one of the sets of mounting apertures 44, 46 such that the guard member 54 is oriented between the cover member 36 and head portion 48 of the fastener 42. In addition to the foregoing components, the releasable attaching means further includes a pair of wing nuts 56 which are threadably engaged to the fasteners 42 in a manner wherein the wing nuts will be abutted against the flange portion 22 when fully tightened.

As seen in FIGS. 1 and 2, the magnetic device 10 is attached to the conduit 12 by initially abutting the outer surface of the cover member 36 against the conduit 12 in a manner wherein the axis A extends in substantially perpendicular relation to the axis B of the conduit 12. Since the first and second sets of mounting apertures 44, 46 are centered on the axis A of the middle one of the three equidistantly spaced rod members 24 and the magnets 26 are positioned on the rod members 24 in substantially perpendicular relation thereto, the magnets 26 will extend longitudinally along and in substantially parallel relation to the axis B of the conduit 12 when the magnetic device 10, and more particularly the outer surface of the cover member 36, is properly positioned thereagainst. Advantageously, this orientation of the magnets 26 relative the conduit 12 and water or other fluid flowing therethrough provides the needed magnetic field density to facilitate the aforementioned treatment effects.

After the outer surface of the cover member 36 has been abutted against the conduit 12, the fasteners 42, one having the clamp member 50 rotatably engaged thereto, and the other having the guard member 54 engaged thereto, are extended through the first and second sets of mounting apertures 44, 46. In those instances when the magnetic device 10 is interfaced to a vertically oriented conduit 12 as shown in FIGS. 1 and 2, the clamp member 50 is preferably oriented such that the notch 52 disposed therein faces downwardly. After the fasteners 42 have been extended through the first and second sets of mounting apertures 44, 46, the clamp member 50 is rotated such that the fastener 42 upon which the guard member 54 is positioned is received into the notch 52. The guard member 54 is then oriented so as to create a barrier between the head portion 48 of the fastener 42 upon which it is positioned and the end of the clamp member 50 including the notch 52 having the fastener 42 received thereinto. The length of the clamp member 50 is such that the notch 52 will easily receive the fastener 42 opposite that to which it is rotatably engaged. Thereafter, the wing nuts 56 threaded onto the fasteners 42 and are tightened thus causing the clamp member 50 to move toward the conduit 12. As will be recognized, the continued tightening of the wing nuts 56 is operable to eventually compress the conduit 12 between the clamp member 50 and outer surface of the cover member 36, thus retaining the magnetic device 10 upon the conduit 12. When the conduit 12 is firmly compressed between the cover member 36 and clamp member 50, each of the wing nuts 56 will be abutted against the flange portion 22 of the housing 14. Since the conduit 12 typically has a tubular configuration, the clamp member 50 preferably has an outwardly bowed central portion 58 to accommodate the conduit 12.

To disengage the magnetic device 10 from the conduit 12, a reverse operation is conducted wherein each of the wing nuts 56 is loosened, thus removing the clamp member 50 from its abutting contact to the conduit 12. Thereafter, the clamp member 50 is rotated upwardly so as to remove the fastener 42 from within the notch 52. The housing 14 is then pulled away out of abutting contact with the conduit 12.

Referring now to FIGS. 6 and 7, illustrated is a magnetic device 100 constructed in accordance with a second embodiment of the present invention. In the second embodiment, the magnetic device 100 comprises a housing 102 which is substantially identical to the housing 14 previously described with respect to the first embodiment, but does not include the rivet receiving apertures 40 disposed within the peripheral regions of the flange portion 104 thereof. In this respect, the flange portion 104 includes only the diametrically opposed mounting apertures 106, 108 therein for receiving the fasteners 42 of the attaching means in the previously described manner.

As an alternative to the rod members 24, disposed within the interior compartment 110 of the housing 102 and attached to the bottom wall portion 112 thereof is at least one, and preferably three, elongate support strips 114 which are identically configured and stacked in a contiguous, overlying relationship. In this respect, the lower most one of the three support strips 114 is affixed to the bottom wall portion 112 via an epoxy. An epoxy is also utilized to affix the middle support strip 114 to the lower most support strip 114 and the top support strip 114 to the middle support strip 114. Also positioned within the interior compartment 110 are two pairs of permanent magnet segments 116, each of which defines a top surface 118 and first and second opposed side surfaces 120, 122 of differing magnet polarity. In the second embodiment, each of the four magnet segments 116 comprising the two pairs is a neodymium magnet which is approximately three-quarters inch long, one-half inch wide and one-fourth inch thick.

As seen in FIGS. 6 and 7, both pairs of magnet segments 116 are positioned within the interior compartment 110 upon the top surface of the uppermost support strip 114 in a manner wherein the lateral sides of the segments 116 of one pair are abutted against the lateral sides of the segments 116 of the other pair. As such, when positioned upon the uppermost support strip 114, the magnet segments 116 define a rectangularly configured body having an overall length of approximately one and one-half inches, a width of approximately one-half inch, and a thickness of approximately one-half inch. Importantly, each of the support strips 114 are preferably sized having an identical overall dimension so as not to extend beyond the lower peripheral edges of the magnet segments 116 when such are positioned upon the uppermost support strip 114. In the second embodiment, each pair of magnet segments 116 is preferably attached to the top surface of the uppermost support strip 114 in an alternating magnetic polarity arrangement with the side surfaces 120 or side surfaces 122 of the segments 116 of each pair being in direct abutting contact with one another. However, the segments 116 of each pair may also be attached to the uppermost support strip 114 in a repetitive magnetic polarity arrangement, with the side surface 120 of one segment 116 of each pair being abutted against the side surface 122 of the other segment 116 of the pair. Though the positioning of the magnet segments 116 in the alternating magnetic polarity arrangement causes a decrease in magnetic strength of approximately one percent (1%) per year, the alternating magnetic polarity arrangement increases the magnetic pull force of the segments 116 and increases the optimum depth of the magnetic field when the magnetic device 100 is attached to the tubular conduit 12.

As seen in FIG. 6, the support strips 114, and hence the magnet segments 116, are positioned within the interior compartment 110 such that the axis C upon which the mounting apertures 106, 108 are centered laterally bisects the support strips 114, i.e. extends along the abutted side surfaces of the first and second pairs of segments 116. As will be recognized, this orientation of the support strips 114 causes the magnet segments 116 to extend longitudinally along the axis B of the tubular conduit 12 when the magnetic device 100, and more particularly, the outer surface of the cover member thereof, is properly positioned thereagainst. If only one pair or more than two pairs of magnet segments 116 are positioned within the interior compartment 110, the support strips 114 upon which such segments 116 are positioned will also be oriented such that the axis C laterally bisects the same.

In the second embodiment, an epoxy is utilized to rigidly attach the cover member to the flange portion 104, thus eliminating the need for the rivet-receiving apertures 40. Additionally, the support strips 114 are preferably fabricated from soft steel and sized to elevate the magnet segments 116 to a level within the interior compartment 110 such that the top surfaces 118 of the segments 116 are abutted against the inner surface of the cover member when such is attached to the flange portion 104. Advantageously, the soft steel construction of the support strips 114 optimizes, i.e. accents, the magnetic strength of the segments 116. The segments 116 are also preferably attached to the top surface of the uppermost support strip 114 via an epoxy. As will be recognized, the support strips 114 may be fabricated having a thickness so that more or less than three support strips are needed to properly elevate the segments 116 within the interior chamber 110. Since the segments 116 are attached to the support strips 114 via an epoxy, and the support strips 114 are attached to each other and to the bottom wall portion 112 of the housing 102 via an epoxy, a quantity of non-ferromagnetic filler material need not be poured into the interior compartment 110.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A magnetic device for treating fluid flowing through a conduit, comprising:
   a housing comprising:
      a bottom wall portion; and
      a continuous side wall portion extending laterally from said bottom wall portion, said side wall and said bottom wall portions defining an interior compartment;
   a plurality of elongate rod members disposed within said interior compartment and attached to the bottom wall portion of said housing in spaced, parallel relation;
   at least one permanent magnet disposed within said interior compartment, said at least one magnet being positioned directly upon and extended laterally across each of the rod members in substantially perpendicular relation thereto and separated from said bottom wall portion by said rod members;
   a cover member rigidly attached to said side wall portion in a manner enclosing said interior compartment, said cover member having inner and outer surface; and
   means for releasably attaching said housing to said conduit in a manner wherein said conduit extends along and is abutted against the outer surface of said cover member so that fluid passing through said conduit will be affected by the magnetic fluid emanating from said at least one magnet disposed within said interior compartment.

2. The device of claim 1 further comprising a mass of non-ferromagnetic filler material disposed within said interior compartment and substantially encapsulating said at least one magnet and said rod members therein.

3. The device of claim 1 wherein said at least one permanent magnet comprises a pair of permanent magnets, each of said magnets having opposed top and bottom surfaces and first and second opposed side surfaces of differing magnetic polarity, said magnets being positioned within said interior compartment and rigidly attached to the rod members.

4. The device of claim 3 wherein said rod members are sized to elevate the magnets to a level within the interior compartment whereat the top surfaces thereof are abutted against the inner surface of the cover member when said cover member is attached to said side wall portion.

5. The device of claim 4 wherein the magnets are attached to the rod members in an alternating magnetic polarity arrangement such that the first side of one magnet of he pair which is of a first polarity is abutted against the first side of the other magnet of the pair which is also of the first polarity.

6. The device of claim 3 wherein said magnets are attached to the rod members in a repetitive magnetic polarity arrangement such that the first side of one magnet of the pair which is of a first polarity is abutted against the second side of the other magnet of the pair which is of a second polarity opposite the first polarity.

* * * * *